United States Patent [19]

Gibson

[11] Patent Number: 5,003,471

[45] Date of Patent: Mar. 26, 1991

[54] WINDOWED PROGRAMMABLE DATA TRANSFERRING APPARATUS WHICH USES A SELECTIVE NUMBER OF ADDRESS OFFSET REGISTERS AND SYNCHRONIZES MEMORY ACCESS TO BUFFER

[76] Inventor: Glenn A. Gibson, 4824 Ballerina, El Paso, Tex. 79922

[21] Appl. No.: 277,415

[22] Filed: Nov. 29, 1988

Related U.S. Application Data

[63] Continuation-in-part of Ser. No. 239,510, Sep. 1, 1988, abandoned.

[51] Int. Cl.$^5$ .................. G06F 13/12; G06F 12/00
[52] U.S. Cl. .................. 364/200; 364/239.6; 364/242.31; 364/255.1; 364/271.1
[58] Field of Search ... 364/200 MS File, 900 MS File

[56] References Cited

U.S. PATENT DOCUMENTS

| | | | |
|---|---|---|---|
| 4,589,067 | 3/1986 | Porter et al. | 364/200 |
| 4,598,365 | 7/1986 | Boothroyd et al. | 364/200 |
| 4,646,259 | 2/1987 | Lincoln et al. | 364/900 |
| 4,653,020 | 3/1987 | Cheselka et al. | 364/900 |
| 4,706,191 | 11/1987 | Hamstra et al. | 364/200 |
| 4,750,107 | 6/1988 | Buggert | 364/200 |
| 4,779,192 | 10/1988 | Torii et al. | 364/200 |
| 4,797,851 | 1/1989 | Suzuki | 364/900 |
| 4,825,359 | 4/1989 | Ohkami et al. | 364/200 |
| 4,849,882 | 7/1989 | Aoyama et al. | 364/200 |

OTHER PUBLICATIONS

Harold Stone, *Hich-Performance Computer Architecture*, Addison-Wesley, 1977, pp. 29-74.

*Primary Examiner*—Thomas C. Lee
*Attorney, Agent, or Firm*—James R. Young

[57] ABSTRACT

An intermediate data buffer for prefetching data from main memory and supplying it to a processing element and taking results from the processing element and outputting them to main memory is disclosed. The apparatus, referred to as a windowed programmable data buffer (WPDB), is a programmable, one-port or two-port circular data buffer that can simultaneously input data from or output results to main memory and output data to or input results from a processing element. The transfer of data between the WPDB and main memory is separated from the transfer of data between the WPDB and the processing element by means of a window. The transfers with the main memory use the locations outside the window and the transfers with the processing element use the locations inside of the window. The window may be programmed to increment forward around the circular buffer or remain stationary. The WPDB can operate in two modes. One mode uses offsets sent by the processing element to access data within the window. The other uses offsets programmed into the WPDB to access the window. The latter allows the WPDB to anticipate the data to be read next so that the data can be prefetched and buffered through a FIFO buffer. Data being written to the WPDB can be buffered through a second FIFO buffer.

12 Claims, 3 Drawing Sheets

WINDOWED PROGRAMMABLE DATA TRANSFERRING APPARATUS WHICH USES A SELECTIVE NUMBER OF ADDRESS OFFSET REGISTERS AND SYNCHRONIZES MEMORY ACCESS TO BUFFER

This application is a continuation-in-part of application Ser. No. 07/239,510 filed Sept. 1, 1988; now abandoned.

BACKGROUND OF INVENTION

This invention relates to information processing systems, and more particularly to buffering data between main memory and the processing elements in such systems. Even more particularly this invention relates to means for prefetching vector and array data, which is being accessed according to a fixed pattern and/or within a relatively small locality, from a data store, such as main memory, into a processing element.

Any processing element must receive the data it is to operate on from some form of data store. Ideally, this data would always be instantly available whenever it is needed by the processing element so that the processing element would never have to wait for data to be fetched. In slower processing systems, the data store is main memory since the main memory is fast enough to keep up with the slower processors. As processor speed increases relative to main memory speed, processors spend a significant amount of time waiting for data unless some form of high speed intermediate memory is placed between the main memory and the processor. This waiting time can be reduced by using a very fast technology to construct the intermediate memory. The difference in the speeds of the main memory and processing element is accommodated by the intermediate memory because the processing element tends to use data and intermediate results more than once.

The waiting time can be further reduced by anticipating which data is to be needed, prefetching it from main memory, and then making the data that is needed next immediately available to the processing element. The needed data is more easily anticipated when accessing vectors and arrays in some regular manner. Most numerical techniques follow a regular pattern when accessing vectors and arrays and, at any given time, must access data confined to a small locality. This invention is designed to take advantage of this method of accessing vectors and arrays.

The conventional means of providing an intermediate data memory is to use a data cache such as those discussed by Harold Stone in *High-performance Computer Architecture*, Addison-Wesley, 1987, pp. 29-74. These caches are widely used, but they do not anticipate which data is needed from main memory. Instead, they retrieve the data from main memory when it is requested by the processing element and retain the data and any intermediate results produced from the data so that they can be reused without further accesses to the main memory. Therefore, there is considerable waiting when the data is originally fetched. Also, these caches are not designed to make data immediately available to the processing element; the cache accesses are limited by the speed of the cache memory.

SUMMARY OF INVENTION

It is the object of this invention to provide a one-part or two-part intermediate data buffer between main memory and a processing element that anticipates the data needed by the processor and prefetches that data into the data buffer by means of a direct memory access (DMA) like channel which is controlled by the processing element. A second DMA like channel is used to store the data in the intermediate data buffer back into the main memory. The rules for controlling the DMA-like channels are also part of the invention.

It is also an object of this invention to allow the intermediate data buffer to be a one-port memory which could involve combining the two DMA-like channels into a single channel.

It is another object of the invention to provide a window within the intermediate data buffer consisting of a set of data that is currently available to the processing element. This window dynamically moves around within the buffer so that it always encompasses the current locality of reference. The rules regulating this movement are part of the invention.

It is another object of this invention to allow the window to be automatically accessed according to a predetermined pattern that has been programmed into the intermediate data buffer prior to using the buffer. In this case, the intermediate data buffer must be capable of being reprogrammed prior to each usage so that the pattern of accesses within the window can be made according to the procedure being used to process the data.

It is another object of this invention to prefetch the next data that will be used by the processing element into a first-in/first-out buffer that allows the data to be accessed immediately in response to the address sent to the intermediate data buffer from the processing element. A second first-in/first-out buffer immediately takes results from the processing element and stores them in the intermediate data buffer.

The invention provides for this prefetching and storing to synchronize data movement in such a way that data will not be prefetched if such data must be updated before being fetched, and data will not be updated until all necessary reads of the old data have been performed.

It is yet another object of this invention to provide address translation so that the addresses used by the processing element instructions can be much shorter than those used by main memory, thus allowing shorter instructions. The addresses used to access the intermediate data buffer may comprise a small set which, in no case, would be larger than the window size. The addresses used by the intermediate data buffer to access main memory may be virtual addresses and their length may be independent of the address length used by the instructions.

The intermediate data buffer is operated as a circular memory. A DMA-like channel automatically brings data from the main memory into the intermediate data buffer in a sequential manner until the input process is blocked. Blocking occurs when the input would overwrite the information in the window and blocking is removed when the window moves to allow more input. Similarly, data is automatically output to main memory by a DMA-like channel which is started and stopped by the movement of the window. The size of the window is programmable, but remains fixed throughout a particular usage of the intermediate data buffer.

Reading from or writing to the intermediate data buffer by the processing element is accomplished by using relative addressing within the window. This is done by associating a base address with the window and addressing within the window relative to this base address or by programming a pattern into the window so that when the intermediate data buffer is addressed it will supply or store data according to this pattern. The programmed pattern approach allows data that will be required by the processor to be prefetched into a first-in/first-out buffer making it immediately available to the processing element, and similarly allows the processor to put results immediately into a first-in/first-out buffer which then stores them in the intermediate data buffer.

BRIEF DESCRIPTION OF THE DRAWINGS

A better understanding of the present invention may be had from the following description of the preferred embodiment when read in the light of the accompanying drawings whose descriptions are.

DESCRIPTION OF PREFERRED EMBODIMENT

Figure 1:
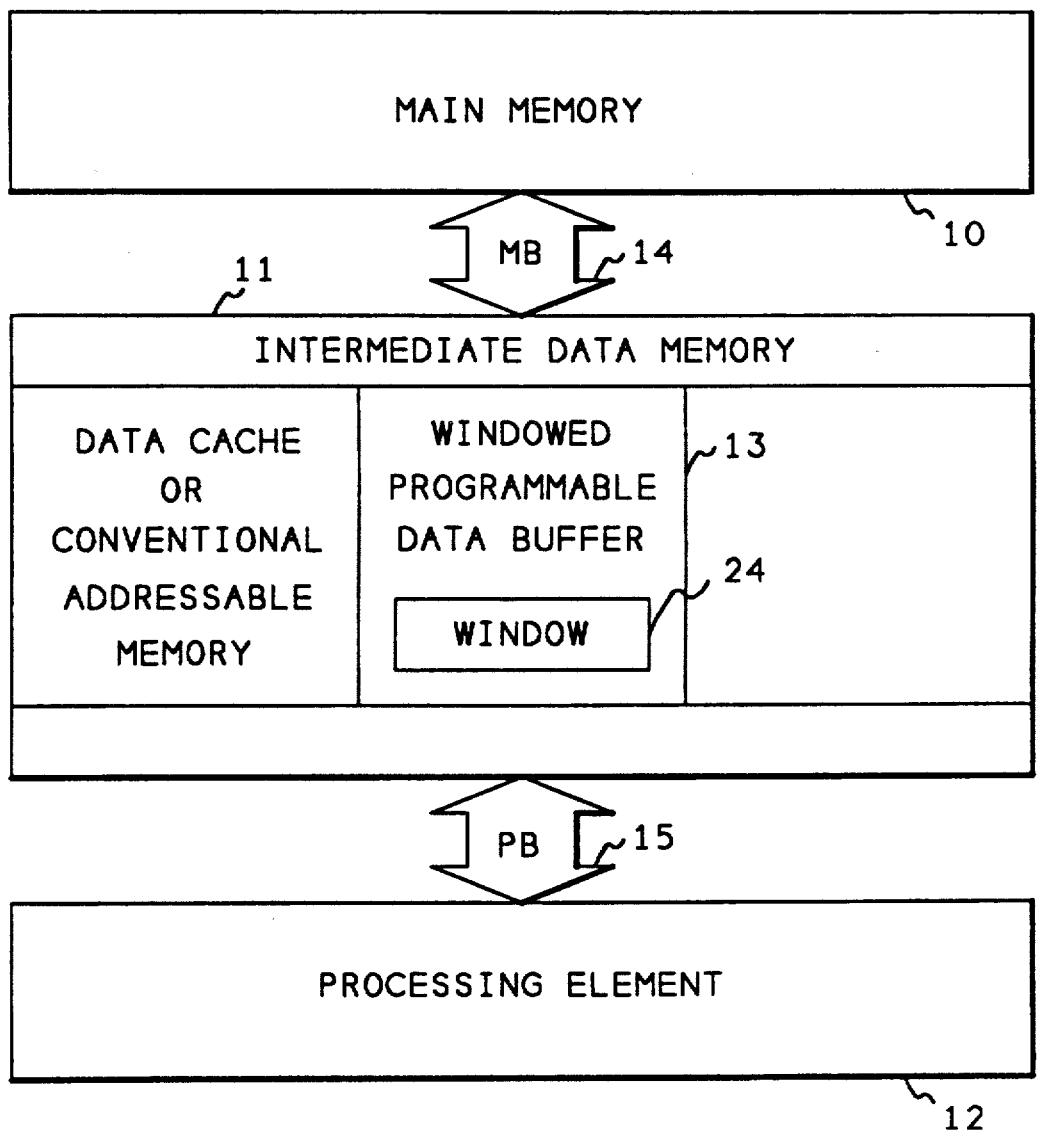
FIG. 1 shows where a windowed programmable data buffer (WPDB) is placed within the framework of a memory hierarchy.

The following description is of the best presently contemplated mode of carrying out the present invention. This description is not to be taken in a limiting sense but is made merely for the purpose of describing the general principles of the invention. The scope of the invention should be determined with reference to the appended claims.

In a computer system, accessing data from main memory is always treated as a random access, even when the data is being fetched from sequential memory locations or when it is being fetched in a regular pattern. This causes little time penalty if the speed of the processing element matches the speed of the memory, however, if the processing element speed is much faster than main memory speed, the processing element is often held up waiting for memory. This problem is most often addressed by using a cache buffer between main memory and the processing element. A cache, being comprised of very fast memory, can satisfy the processing element more quickly. Speed is further matched since the cache reads many main memory locations each time it addresses main memory and saves any extra data for later use. This improves the access time for sequential data since a first access will read several main memory locations, store them in the cache and subsequent processing element accesses will be from the high speed cache rather than main memory. When the processing element needs data that are not sequential the likelihood that the data is not in cache increases. Each time there is a cache miss the processing element must wait on a main memory access.

This invention provides a high speed intermediate buffer between main memory and a processing element that can be programmed to anticipate data that will be needed in any regular pattern, sequential or otherwise. Examples of such a regular pattern include many numerical methods for processing arrays of data (e. g., predictor-corrector methods for solving differential equations). The invention increases the speed with which vector or array data are input by bringing them into a high speed buffer in advance of being used. It may further increase this speed by fetching the data from the high speed buffer before the processing element requests them and then placing them in a first-in/first-out (FIFO) buffer. This permits the data in many high speed buffer locations to be prefetched and stacked to wait for a processing element request. The invention also allows the outputting from the processing element to the main memory to be similarly overlapped.

For implementing the transfer of data into and out of the FIFO buffers, a set of registers is used. Each register in this set is programmed to contain the relative address of one element of data, and a limit register is programmed to specify how many of the data address registers are used in a particular operation. As the processing element requests or outputs data, the registers are accessed sequentially and, therefore, the pattern of the data accesses is determined by the order of the relative addresses in the register set. The pattern may be repeated a programmable number of times with the relative addresses being incremented between repetitions. The register set containing the access pattern can be programmed to intermix read and write operations in such a way that reading and writing are properly synchronized.

A window is provided to allow the main memory and processing element to overlap their accesses to the high speed buffer. The processing element is allowed to access only that portion of the high speed buffer that is inside the window and the main memory operations can access only that portion of the high speed buffer that is outside the window. The window may be programmed to automatically increment around the high speed buffer as processing progresses.

Referring to FIG. 1, a two-port, high speed Intermediate Memory 11 can be established between a Main Memory 10 and a Processing Element 12. Although the intermediate Memory 11 may be either a one port or a two port memory, the following description assumes a two port memory. The Memory Bus (MB) 14 is the communications link between the Main Memory 10 and the Intermediate Memory 11 and the Processor Bus (PB) 15 is the communications link between the Intermediate Memory 11 and the Processing Element 12. The Intermediate Memory 10 may include one or more intermediate data buffers in addition to conventional addressable memory or data cache. It is the embodiment of one of these intermediate data buffers, hereafter referred to as a Windowed Programmable Data Buffer (WPDB) 13 that is the present invention. The storage circuitry that constitutes the storage portion of a WPDB 13 may be memory permanently associated with the WPDB 13 or it may be a portion of a large memory that contains all of the storage circuitry for all of the WPDBs in the Intermediate Memory 11. The latter, more general case, is assumed in the description provided below. Within each WPDB 13 there is a moving Window 24 which separates the communication with the Main Memory 10 from the communication with the Processing Element 12 and provides a range of addresses for the communications with the Processing Element 12.

There are up to five processes involved in using a WPDB 13. They are the:

1. Input process which uses a DMA-like channel to input data from the Main Memory 10 into the WPDB 13.
2. Output process which uses a DMA-like channel to output data from the WPDB 13 to the Main Memory 10.

3. Windowing process which moves the Window 24 within the WPDB 13.
4. Read/write process which uses relative addressing to provide the Processing Element 12 read/write access to the WPDB 13.
5. Buffering process which buffers the data from the Window 24 before it is read by the read/write process and to the Window 24 after it is written by the read/write process.

This invention includes the hardware organization for incorporating these processes into the WPDB 13 and the general concepts implied by the rules for controlling these processes. All five processes may be active simultaneously and all addressing of a WPDB 13 treats the WPDB 13 as a circular memory with the lowest address in the WPDB 13 following the highest address in the WPDB 13.

Inputting and outputting are sequential relative to the addressing of both the WPDB 13 and the Main Memory 10. With respect to the WPDB 13, while the Processing Element 12 is reading from and writing to the WPDB 13 all inputs from and outputs to the Main Memory 10 are to addresses outside the Window 24. Inputting to the Window 24 can occur only when the Window 24 is being filled at the beginning of a particular usage of the WPDB 13 and outputting from the Window 24 can occur only at the completion of a usage. The Window 24 can move only by incrementing forward around the WPDB's circular memory and only when all input and output in the area to be occupied by the Window 24 have been completed. Reading and writing can be done only from or to locations within the Window 24. A read from or write to a location outside the current Window 24 must wait until the Window 24 is moved to include the location to be accessed.

It is possible for a particular usage of a WPDB 13 to not involve one or more of four of the five processes. The input, output, and windowing processes, which automatically perform their actions, may be specifically excluded by programming certain control bits within the WPDB 13. Whether or not the buffering process is in use depends on the mode defined below. The read/write process is not an automatic process, because all reads and writes are initiated by the Processing Element 12, and cannot be excluded. Inputting and outputting may be done by autoincrementing or autodecrementing the Main Memory 10 address. Whether autoincrementing or autodecrementing is used is also determined by programming a WPDB 13 control bit. Another programmable control bit determines the buffer mode. There are the following two modes:

Pattern mode which forms a read or write address by adding an offset stored within the WPDB 13 to the base address of the Window 24 plus the base address of the WPDB's assigned memory array within the Intermediate Data Memory 11.

Random mode which forms a read or write address by adding the low order bits of the address output by the Processing Element 12 to the base address of the Window 24 plus the base address of the WPDB's assigned memory array.

The buffering process is in use if and only if the pattern mode is being used. The amount w by which the beginning and ending addresses of the window 24 are to be incremented is also programmable.

The width of the data bus within MB 14 is denoted by n and the width of the data bus within PB 15 is denoted by m. These widths are fixed and are expressed in terms of the basic addressable units (e.g., bytes) of the WPDB 13. The size of the WPDB's memory array in basic addressable units is assumed to be a multiple of n; otherwise the circuitry for implementing the WPDB 13 would be complicated significantly.

Each WPDB 13 has a permanently assigned set of four addresses that can be used by the Processing Element 12 to communicate with it. The lowest address in this set must be divisible by 4. The addresses whose two low-order bits are 10, 11, and 01 are used to give the WPDB 13 suspend, reset, and partial reset commands. A suspend, which is initiated by an output to the address whose low-order bits are 10, causes the WPDB's activity to be suspended and may cause the programmable state of the WPDB 13 to be output to the Main Memory 12. Whether or not the programmable state is output to the Main Memory 12 is determined by the high-order bit on the data bus, which is 0 if the state is not to be output and 1 if it is to be output. A reset, which is initiated by an output to the address whose low-order bits are 11, causes the programmable state of the WPDB 13 to be input from Main Memory 12. A partial reset, which is initiated by an output to the address whose low-order bits are 01, causes the state of the WPDB 13 to be partially changed according to the data output by the Processing Element 12. For a suspend or reset all but the high-order data bit on the data bus portion of the PB 15 is the Main Memory 10 address to or from which the programmable state is to be transferred. When the WPDB 13 is in its pattern mode, the low-order address (00) is used for all data accesses to the WPDB 13 by the Processing Element 12. When the WPDB 13 is in its random mode it has an additional set of addresses that can be used by the Processing Element 12 to access data. This set is a consecutive set of addresses that extends from the base address of the memory array assigned to the WPDB 13 to the address that equals the base address plus $2^r-1$, where r is the smallest integer such that $2^r$ is greater than or equal to the size of the Window 24. Both the base address of the memory array and the size of the Window 24 are programmable.

Figure 2:
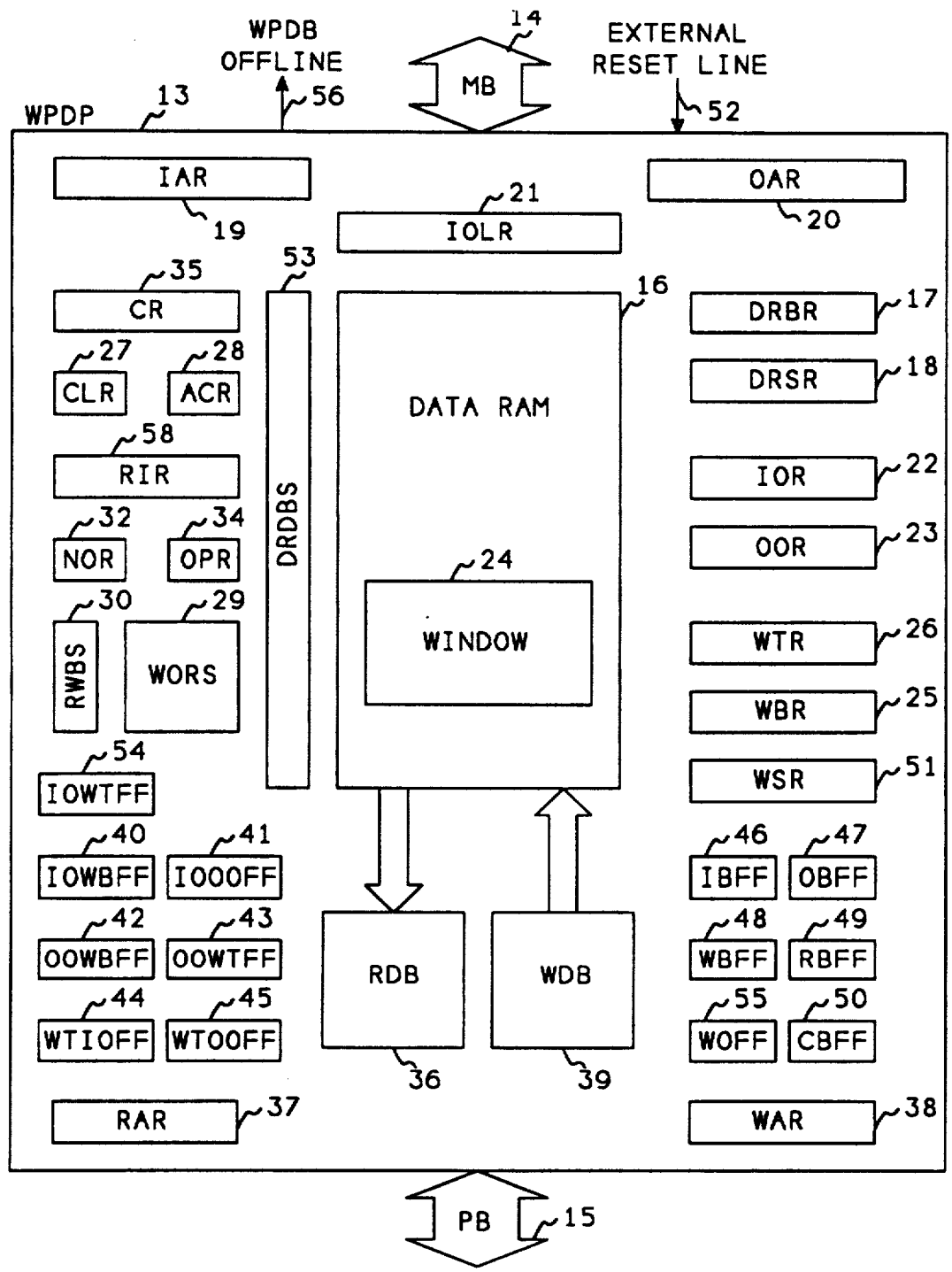
FIG. 2 summarizes the major components of a WPDB.

The major components and flip-flops in a WPDB 13 are given in FIG. 2. The Control Register (CR) 35 consists of the programmable control bits:

Input mode (IM) bit which controls whether there is (1) or is not (0) inputting from main memory.

Output mode (OM) bit which controls whether there is (1) or is not (0) outputting to main memory.

Window mode (WM) bit which controls whether there is (1) or is not (0) automatic windowing. When in the pattern mode (BM=0), there should be automatic windowing (WM=1).

Forward/backward (FB) which determines whether the input and output Main Memory 10 addresses are autoincremented (1) or autodecremented (0).

Buffer mode (BM) bit which indicates whether the WPDB 13 is in its pattern (0) or random (1) mode.

Window Increment Field (WIF) which indicates the amount by which the limits of the Window 24 are to be incremented by the windowing process.

Repetition Increment Field (RIF) which indicates the amount by which the relative addresses used to access the Window 24 are changed with each pattern repetition. (This field is used only in the pattern mode.)

The Data RAM 16 is the storage circuitry of the WPDB 13. It may physically be a part of a large memory that is shared by other WPDBs, in which case the Data Range Base Register (DRBR) 17 gives the base address of the part of the large memory that is used by the WPDB 13 and the Data Range Size Register (DRSR) 18 gives the size (in basic addressable units) of this part. The Window 24 is always within the Data RAM 16 and is defined to include all locations from its base, whose offset within the Data RAM 16 is the contents of the Window Base Register (WBR) 25, to its top, whose offset within the Data RAM 16 is the contents of the Window Top Register (WTR) 26. The size of the window (in basic addressable units) is stored in the Window Size Register (WSR) 51. The Window 24 moves within the Data RAM 16 by incrementing the WBR 25 and WTR 26 according to the WIF in the CR 35. Because the Data RAM 16 is considered to be a circular memory and the Window 24 must stay within the Data RAM 16, the offsets in WBR 25 and WTR 26 are computed modulo the contents of the DRSR 18.

If the input process is unblocked, it copies the contents of the Main Memory 10 location whose address is the contents of Input Address Register (IAR) 19 into the Data RAM 16 location whose offset within the Data RAM 16 is the contents of the Input Offset Register (IOR) 22. It then autoincrements the IOR 22 by n and autoincrements or autodecrements the IAR 19 by n according to the FB bit in the CR 35, where n is the width of the MB 14 in basic addressable units. If the output process is unblocked, the output process copies the contents of the Data RAM 16 location whose offset within the Data RAM 16 is the contents of the Output Offset Register (OOR) 23 into the Main Memory 10 location whose address is the contents of the Output Address Register (OAR) 20. It then autoincrements the OOR by n and autoincrements or autodecrements the OAR by n according to the FB bit. Both the IOR 22 and the OOR 23 are incremented modulo the contents of the DRSR 18. If the FB bit indicates autoincrementing is being used, the Input/output Limit Register (IOLR) 21 contains the highest Main Memory 10 address that is to be input from or output to; otherwise, it contains the lowest address that is to be input from or output to. (By having a second FB bit, it would be possible to also allow IOR 22 and OOR 23 to be autodecremented.)

Each Data RAM 16 location has a corresponding bit in the Data RAM Dirty Bit Set (DRDBS) 53. Those locations that have been changed by a write to the Data RAM 16 by the Processing Element 12 are marked at the time the write is made by setting the corresponding bit in the DRDBS 53 to 1. When a Data RAM 16 location is to be output, this bit is checked and if it is 0, then the contents of Main Memory 10 location to be output to is the same as the Data RAM 10 location and the output is unnecessary; otherwise, the output is conducted. If the output is made, the contents of Data RAM 16 locations and the Main Memory 10 locations once again become the same and the DRDBS 53 bit for the location being output from is cleared to 0.

If the windowing process is unblocked, then each time a processor read or write access is made the Access Count Register (ACR) 28 decrements by 1. The Window 24 stays constant (i.e., the WBR 25 and WTR 26 do not change) until the contents of the ACR 28 become 0 at which time the WBR 25 and WTR 26 are incremented by the amount in the WIF of the CR 35 and the contents of the Count Limit Register (CLR) 27 are copied to the ACR 28. When windowing is not used the random mode should be in effect and the size of the Window 24 is normally set to equal the size of the Data RAM 16.

If the read/write process is unblocked then a read or write requested by the Processing Element 12 may be made from or to the WPDB 13. For a read the data is taken from the Read Data Buffer (RDB) 36 and put on the data bus portion of PB 15, and for a write the data is taken from the data bus in PB 15 and put into the Write Data Buffer (WDB) 39. Both the RDB 36 and WDB 39 are first-in/first-out buffers, but when the WPDB 13 is in its random mode (BM=1) the buffering process is not in use and only one location in each buffer is used. When in the pattern mode (BM=0) a read may be performed whenever RDB 36 is not empty and a write may be performed whenever the WDB 39 is not full.

Transfers are made from the Window 24 to the RDB 36 using the Read Address Register (RAR) 37 and from the WDB 39 to the Window 24 using the Write Address Register (WAR) 38. When in the random mode the address in the RAR 37 or WAR 38 is formed by adding the contents of the DRBR 17 to the sum (modulo the contents of the DRSR 18) of WBR 25 and the r low-order bits of the address bus portion of PB 15 (where r is as defined above). When in the pattern mode the address in RAR 37 or WAR 38 is determined by adding the contents of the DRBR 17 to the sum (modulo the contents of the DRSR 18) of the contents of WBR 25, of one of the registers in the Window Offset Register Set (WORS) 29, and the Repetition Increment Register 58. The registers in the WORS 29 have register addresses 0 through q−1, but it may be that not all of them are used. The Number of Offsets Register (NOR) 32 contains the number of registers in the WORS 29 that are being used and these registers will have addresses 0 through the contents of NOR 32 minus 1. The register used to compute the current RAR 37 or WAR 38 address is the one pointed to by the Offset Pointer Register (OPR) 34. Each time there is a processor read or write the OPR 34 is used to select a register from the WORS 29 and that register is used to compute the contents of the RAR 37 or WAR 38. Then the OPR 34 is incremented by 1 (modulo the contents of NOR 32) and the ACR 28 is decremented by 1. Each time OPR increments to 0 the contents of the RIR 58 are changed by the amount in the RIF of CR 35. As indicated above, when the ACR 28 decrements to 0 it is refilled from the CLR 27 by the windowing process. Also, the RIR 58 is cleared to 0 at this time. In the pattern mode read buffering may continue when RDB 36 is not full and the contents of ACR are greater than 0, and write buffering may continue when the WDB is not empty and the contents of ACR are greater than 0.

Associated with the WORS 29 is the Read/write Bit Set (RWBS) 30. Each register in the WORS 29 has a corresponding bit in the RWBS 30. If a register in the WORS 29 is used for a read access its corresponding bit in the RWBS 30 must be 0; otherwise the register is used for a write access and the corresponding bit in the RWBS 29 must be 1. Whenever the RDB 36 is not full it automatically retrieves data from the Window 24 in advance of read requests from the Processing Element 12; however, whenever the OPR 34 points to a register in the WORS 29 that has a corresponding bit in the RWBS 30 that is 1, then the automatic retrieval must stop and wait for the indicated write to be conducted. Similarly, the WDB 39 automatically stores data into the Window 24 whenever the WDB 39 is not empty, but must suspend such storing whenever a register in the WORS 29 is encountered that has a corresponding bit in the RWBS that is 0. This requires that the pattern of reads and writes initiated by the Processing Element 12 must be identical to the pattern of 0s and 1s in the RWBS 30. This mechanism provides a means of synchronizing the reads and writes to prevent the prefetching of information if the information must be updated before being read, or writing information before all necessary reads of the old value have occurred.

The main memory input and output processes are blocked or unblocked according to the flip-flops (FFs) 40 through 50, 54, and 55; the CR bits 35; and the contents of IOR 22, OOR 23, WBR 25, WTR 26, ACR 28, and CLR 27. The FFs are divided into two groups, the circular position group and the busy group. The FFs in the circular position group are needed to ascertain the relative positions (with respect to each other) of the input, output, window base, and window top pointers as offsets within the Data RAM 16, which is treated as a circular memory. For the purposes of the definitions given below, if all quantities are taken modulo the contents of the DRSR 18 and a quantity x is incremented by $k>0$ and a second quantity y is such that $y=x+i$ for some $i=0,\ldots,k-1$, then the quantity x is said to increment past the quantity y. Also, in general, if a symbol that represents a register is enclosed in parentheses then the contents of the register is being indicated. Using this terminology the FFs in the circular position group are defined as follows:

Input Offset/Window Base (IOWBFF) 40—Set to 1 at the end of a reset or partial reset sequence or when (WBR)−n becomes equal to or increments past (IOR), and cleared to 0 at the beginning of a suspend, reset, or partial reset sequence or when (IOR) increment past (WBR)−n.

Input Offset/Output Offset (IOOOFF) 41—Set to 1 at the end of a reset or partial reset sequence or when (OOR) increment past (IOR), and cleared to 0 at the beginning of a suspend, reset, or partial reset sequence or when (IOR) become equal to or increment past (OOR).

Output Offset/Window Base (OOWBFF) 42—Set to 1 when (WBR)−n becomes equal to or increments past (OOR), and cleared to 0 at the beginning of a suspend, reset, or partial reset sequence or when (OOR) increment past (WBR)−n.

Output Offset/Window Top (OOWTFF) 43—Set to 1 at the beginning of a suspend, reset, or partial reset sequence, or when OM=1 and WM=1 and ACR=0 and (OAR) become greater than (IOLR)−(WSR) if FB=1 or (OAR) become less than (IOLR)−(WSR) if FB=0, or when OM=1 and WM=1 and (ACR) become 0 and (OAR) are greater than (IOLR)−(WSR) if FB=1 or (OAR) are less than (IOLR)+(WSR) if FB=0. It is cleared to 0 at the end of a reset or partial reset sequence or when (OOR) increment past (WTR).

Window Top/Input Offset (WTIOFF) 44—Set to 1 when (IOR) increment past (WTR)+(WIF), and cleared to 0 at the beginning of a suspend, reset, or partial reset sequence or when (WTR)+(WIF) becomes equal to or increments past (IOR).

Window Top/Output Offset (WTOOFF) 45—Set to 1 at the end of a reset or partial reset sequence or when (OOR) increment past (WTR)+(WIF), and cleared to 0 at the beginning of a suspend, reset, or partial reset sequence or when (WTR)+(WIF) becomes equal to or increments past (OOR,.

Input Offset/Window Top (IOWTFF) 54 —Set to 1 when (IOR) increment past (WTR), and cleared to 0 at the end of a reset or partial reset sequence.

The FFs in the busy group are defined as follows:

Input Busy (IBFF) 46 —Set to 1 at the end of a reset or partial reset sequence if IM=1, and cleared to 0 at the beginning of a suspend, reset, or partial reset sequence or when (IAR) become greater than (IOLR) if FB=1 or (IAR) become less than (IOLR) if FB=0.

Output Busy (OBFF) 47 —Set to 1 at the end of a reset or partial reset sequence if OM=1, and cleared to 0 when OOWTFF goes from 1 to 0.

Window Busy (WBFF) 48 —Set to 1 at the end of a reset or partial reset sequence if WM=1 and (WTR) are less than the absolute value of (IOLR)−(IAR), and cleared to 0 at the beginning of a suspend, reset, or partial reset sequence or when OOWTFF goes from 1 to 0 or when IM=1 and IBFF=0 and WTIOFF does from 1 to 0.

Read/write Busy (RBFF) 49 —Set to 1 at the end of a reset or partial reset sequence if IM=0 or when IOWTFF=1 if IM=1. It is cleared to 0 at the beginning of a suspend, reset, or partial reset sequence or when WM=1 and WBFF=0 and (ACR) become 0.

Command Busy (CBFF) 50 —Set to 1 at the beginning of a suspend, reset, or partial reset sequence and cleared to 0 at the end of a suspend, reset, or partial reset sequence.

Window On (WOFF) 55 —Set to 1 at the beginning of a reset or partial reset sequence and cleared to 0 after outputting is completed during a suspend sequence or when OBFF goes from 1 to 0 if OM=1 or RBFF goes from 1 to 0 if OM=0.

In addition all FFs are cleared by an external reset, which occurs when there is a pulse on the External Reset Line 52.

When WOFF 55 is off (WOFF=0), except for a reset of partial reset address the WPDB 13 takes no internal action when it receives one of its assigned addresses. While WOFF is on (WOFF=1), an access by the Processing Element 12 to the WPDB 13 that occurs while the read/write process is blocked is put in a pending state and is allowed to proceed when the process becomes unblocked. The complement of WOFF is output over the WPDB Off Line 56 and is used to signal the completion of a usage of the WPDB 13. A suspend, reset, or partial reset command from the Processing Element 12 to the WPDB 13 that occurs while CBFF=1 is put in a pending state until the CBFF is cleared to 0, then it is processed.

The programmable state of the WPDB 13 is defined to consist of the contents of the IAR 19, IOLR 21, CR 35, DRBR 17, DRSR 18, WTR 26, CLR 27, NOR 32, the bits in the RWBS 30, and registers in the WORS 29. During a suspend sequence, if the high-order bit on the PB 15 data bus is 1 then these registers are automatically output sequentially to a block of consecutive Main Memory 10 locations beginning at the address indicated by the data on the PB 15 (excluding the high-order data bit). During a reset sequence these registers are automatically input sequentially from a block of consecutive Main Memory 10 locations beginning at the address indicated by the data on PB 15 (excluding the high-order data bit). The order in which the information is stored by a suspenc is the same as the order in which it is retrieved by a reset so that they may be considered reciprocal operations. Suspend and reset operations may be used to temporarily suspend the usage of a WPDB 13 and then resume the usage later. The nonprogrammable state of WPDB 13 is the contents of the OAR 20, IOR 22, OOR 23, WBR 25, WSR 51, ACR 28, RIR 58, OPR 34, RAR 37, WAR 38, RDB 36, WDB 39, DRDBS 53, and the flip-flops.

When there is a reset, after the programmable state has been loaded from Main Memory 10 the OAR 20 is set equal to the IAR 19, the quantity (WTR)+1 is put into the WSR 51, the ACR 28 is set equal to the CLR 27, the RAR 37 and WAR 38 are set according to the addressing rules discussed above, the RDB 36 and WDB 39 are considered empty, the flip-flops are set as described above, the bits in the DRDBS 53 are all cleared to 0, and all other registers whose contents are considered part of the nonprogrammable state (i. e., the IOR 22, OOR 23, WBR 25, RIR 58, and OPR 34) are cleared to 0. When there is a partial reset the IAR 19 and IOLR 21 are loaded from the data portion of the PB 15; OAR 20 is set equal to the IAR 19; the WTR 26 is set equal to the quantity (WSR)−1; the ACR 28 is set equal to the CLR 27; the IOR 22, OOR 23, WBR 25, RIR 58, and OPR 34 are cleared to 0; the RAR 37 and WAR 38 are set according to the addressing rules discussed above; the RDB 36 and WDB 39 are considered empty; the flip-flops are set as described above; the bits in the DRDBS 53 are cleared to 0; and the CR 35, DRBR 17, DBSR 18, WSR 51, CLR 27, NOR 32, RWBS 30, and WDRS 29, which are the registers that define the Data RAM 16 and Window 24 and its usage, are left unchanged.

Using the above definitions of the programmable and nonprogrammable states, the suspend, reset, and partial reset sequences are summarized as follows:

Suspend Sequence

1. Set CBFF 50 to 1 and clear RBFF 49 to 0.
2. Wait for WDB 39 to become empty.
3. Clear IOWBFF 40, IOOOFF 41, OOWBFF 42, WTIOFF 44, WTOOFF 45, IBFF 46, and WBFF 48 to 0 and set OOWTFF 43 to 1.
4. If OBFF=1, wait for it to be cleared to 0.
5 Clear WOFF 55 to 0. If the high-order data bit on PB 15 is 1, then output the programmable state to the array in Main Memory 10 whose beginning address is indicated by the other bits on the data bus portion of the PB 15; otherwise do nothing.
6. Clear OOwTFF 43 to 0.
7. Clear CBFF 50 to 0.

Reset Sequence

1. Set CBFF 50 to 1 and clear RBFF 49 to 0.
2. Wait for WDB 39 to become empty.
3. Clear IOWBFF 40, IOOOFF 41, OOWBFF 42, WTIOFF 44, WTOOFF 45, IBFF 46, and WBFF 48 to 0 and set OOWTFF 43 and WOFF 55 to 1.
4. If OBFF=1, wait for it to be cleared to 0.
5. Input the programmable state from the array in Main Memory 10 whose beginning address is indicated by the data bus portion of the PB 15.
6. Set the nonprogrammable state as described above
7. Set IOWBFF 40, IOOOFF 41, WTOOFF 45, IBFF 46 if IM=1, OBFF 47 if OM=1, WBFF 48 if WM=1 and (WTR)<|(IOLR)−(IAR)|, and RBFF 49 if IM=0 to 1 and clear OOWTFF 43 and IOWTFF 54 to 0.
8. Clear CBFF 50 to 0.

Partial Reset Sequence

1. Set CBFF 50 to 1 and clear RBFF 49 to 0.
2. Wait for WDB 39 to become empty.
3. Clear IOWBFF 40, IOOOFF 41, OOWBFF 42, WTIOFF 44, WTOOFF 45, IBFF 46, and WBFF 48 to 0 and set OOWTFF 43 and WOFF 55 to 1.
4. If OBFF=1, wait for it to be cleared to 0.
5. Set the programmable and nonprogrammable states as described above.
6. Set IOWBFF 40, IOOOFF 41, WTOOFF 45, IBFF 46 if IM=1, OBFF 47 if OM=1, WBFF if WM=1 and |(WTR)<(IOLR)−(IAR)|, and RBFF 49 if IM=0 to 1 and clear OOWTFF 43 and IOWTFF 54 to 0.
7. Clear CBFF 50 to 0.

The input, output, and windowing processes may proceed automatically whenever they are unblocked and are disabled whenever they are blocked. The read/write process may proceed under the control of the Processing Element 12 whenever it is unblocked. The WPDB 13 may receive a read or write command from the Processing Element 12 even while the read/write process is blocked; however, if a read or write command is received while the read/write process is blocked, it will not proceed until the read/write process is unblocked. The input process is unblocked if $$IBFF=1 \text{ and } \{OM=1 \text{ and } IOOOFF=1 \text{ or } OM=0 \text{ and } IOWBFF=1\}$$

and is otherwise blocked. The output process is unblocked if $$OBFF=1 \text{ and } \{OOWTFF=1 \text{ or } OOWBFF=1\}$$

and is otherwise blocked. The windowing process is unblocked if $$WBFF=1 \text{ and } (ACR)=0 \text{ and } \{IM=1 \text{ and } WTIOFF=1 \text{ or } IM=0 \text{ and } WTOOFF=1 \text{ or } IM=0 \text{ and } OM=0\}$$

and is otherwise blocked. The read/write process as a whole is unblocked if $$RBFF=1 \text{ and } \{BM=1 \text{ and } (ACR)>0 \text{ or } BM=0 \text{ and } WM=1\}$$

and is otherwise blocked. However, in addition, a read is blocked if the RDB 36 is empty and a write is blocked if the WDB 39 is full. The buffering process as a whole is unblocked when the pattern mode is in use and $$(IM=0 \text{ or } IOWTFF=1) \text{ and } WM=1 \text{ and } (ACR)>0$$

and is otherwise blocked. However, in addition, read buffering is blocked when RDB 36 is full and write buffering is blocked when WDB 39 is empty.

Figure 3:
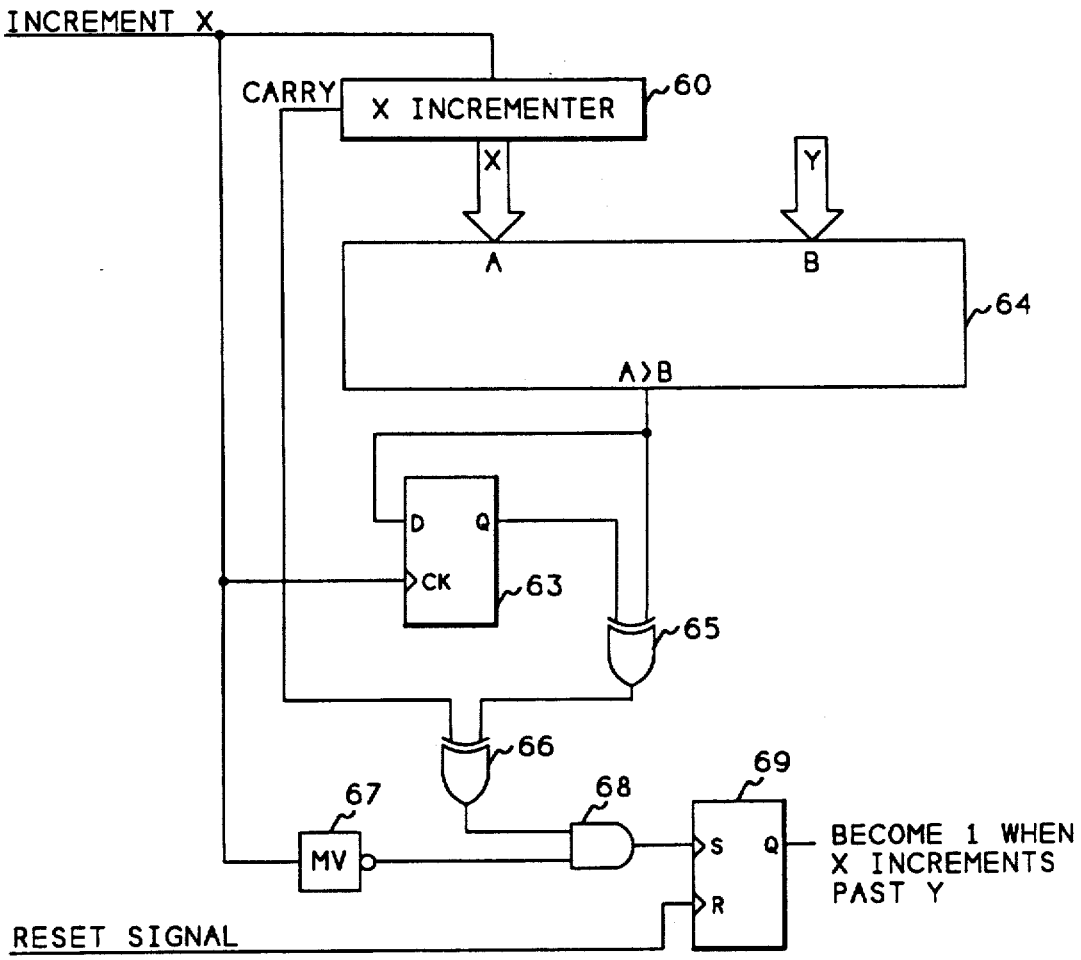
FIG. 3 gives the logical design of a circuit that indicates when one quantity has incremented past a second quantity.

A circuit which indicates when a quantity x increments past a quantity y, where both x and y are modulo $2^p$, is given in FIG. 3. The amount by which x is incremented is assumed to be less than or equal to $2^p$. The x incrementer 60, whose contents are x, increments x by a predetermined amount when an Increment x pulse is applied to it. It continually outputs the current value of x and a carry signal. The x output of the x incrementer 60 and the quantity y are input by the comparator 64. The comparator 64 outputs a 1 to the XOR gate 65 and FF 63 if and only if x is greater than y. The Increment x pulse also causes 1 to be latched into FF 63 if the current value of x is greater than y; otherwise 0 is latched into FF 63. Gate 65 XORs the current x to y comparison with the new x to y comparison after x has been incremented. The carry signal from the x incrementer 60 is 1 if and only if the new value of x is greater than or equal to the current value of x. Gate 66 XORs the carry signal with the output of Gate 65 and the output of Gate 66, after it has stabilized, is 1 if and only if x has incremented past y. The monostable multivibrator (MV) 67 is triggered by the Increment x pulse and outputs a negative-going pulse which causes AND gate 68 to temporarily block the Gate 66 output from reaching FF 69 until the output of Gate 66 has stabilized. The output of FF 69 provides the stabilized indication that x has incremented past y. Any appropriate reset signal can be used to clear FF 69 to 0. By replacing comparator 64 with a comparator that outputs a 1 when x is greater than or equal to y the output of 69 could be made to indicate when x has become equal to or incremented past y.

While the invention herein disclosed has been described by means of specific embodiments and applications thereof, humerous modifications and variations could be made thereto by those skilled in the art without departing from the spirit and scope of the present invention. It is therefore to be understood that within the scope of the appended claims, the invention may be practiced otherwise than as specifically described herein.

What is claimed is:

1. A programmable high speed buffer, logically located between a processing element and main memory of a computer, comprising:
    high speed memory means for temporarily storing data;
    main memory transfer means for transferring data between said high speed memory means and said main memory;
    programmable transfer means for transferring data in a regular pattern between said high speed memory and said processing element comprising
        a plurality of window offset registers each of which can contain an address of an addressable unit of data in said high speed memory;
        window offset limit means for limiting the number of window offset registers used;
        address register means for containing an address of an addressable unit of data in said high speed memory means,
        sequential register access means for sequentially accessing said plurality of window offset registers, up to the number contained in said window offset limit means, to transfer the contents of said accessed register to said address register means, and
        buffer means responsive to said address register means for transferring an addressable unit of data between said high speed memory and said processing element;
    means for preventing said main memory transfer means and said programmable transfer means from using identical high speed memory locations comprising window means for reserving an area of said high speed memory for access exclusively by said programmable transfer means comprising
        lower bound register means for defining a lowest address of said window,
        upper bound register means for defining a highest address of said window,
        size register means for defining a number of addressable units contained within said window,
        access count means for counting accesses made by said processing element to said high speed memory, and
        window movement means responsive to said access count means for adjusting said lower bound register and said upper bound register when said access count mean searches a predetermined value; and
    means for transferring programming information from said processing element to said programmable transfer means.

2. The programmable high speed buffer of claim 1 wherein said sequential register access means further comprises;
    means for modifying said contents of said window offset registers during said transfer by adding an output of a repetition increment register;
    means for modifying the contents of said repetition increment register each time said sequential register access means repeats a sequence.

3. The programmable high speed buffer of claim 1 wherein said buffer means comprises:
    a read first-in/first-out buffer comprising a plurality of registers for transferring addressable units of data from said high speed memory to said processing element; and
    a write first-in/first-out buffer comprising a plurality of registers for transferring addressable units of data from said processing element to said high speed memory;
    whereby multiple addressable units of data can be readied for transfer to or from said processing element.

4. The programmable high speed buffer of claim 2 wherein said sequential register access means further comprises:
    base register means for providing a base address of data within said high speed memory;
    means for adding said contents of said window offset registers and said repetition increment register to said base register means and transferring said sum to said address register means;
    whereby said addresses in said window offset registers can be short addresses allowing shorter instructions in said processing element and whereby said repetition increment registers can allow the short addresses to be modified with each repetition of the pattern.

5. A programmable high speed buffer, logically located between a processing element and main memory of a computer, comprising:
    high speed memory means for temporarily storing data;
    main memory transfer means for transferring data between said high speed memory means and said main memory comprising
        main memory address register means for containing an address of an addressable unit of said main memory,
        high speed buffer address register means for containing an address of an addressable unit of said high speed buffer, transfer means responsive to both said address register means for moving data between locations addressed by said main memory address register means and said high speed buffer address register means, autoadvancing means for autoincrementing or autodecrementing both said address register means after data is transferred between said main memory and said high speed buffer, and blocking means for stopping said transfer when said address in said main memory address register means addresses a portion of said high speed buffer being used by programmable transfer means;

said programmable transfer means transferring data in a regular pattern between said high speed memory and said processing element and comprising a plurality of window offset registers each of which can contain an address of an addressable unit of data in said high speed memory, window offset limit means for limiting the number of window offset registers used, address register mans for containing an address of an addressable unit of data in said high speed memory means, sequential register access means for sequentially accessing said plurality of window offset registers, up to the number contained in said window offset limit means, to transfer the contents of said accessed register to said address register means, and buffer means responsive to said address register means for transferring an addressable unit of data between said high speed memory and said processing element;

means for preventing said main memory transfer means and said programmable transfer means from using identical high speed memory locations; and means for transferring programming information from said processing element to said programmable transfer means.

6. The programmable high speed buffer as defined in claim 5 further comprising a plurality of data modified bits, one bit associated with each addressable unit of data of said high speed memory, wherein the contents of each said bit defines whether said addressable unit of data must be written back to said main memory.

7. A programmable high speed buffer, logically located between a processing element and main memory of a computer, comprising:

high speed memory means for temporarily storing data;

main memory transfer means for transferring data between said high speed memory means and said main memory;

programmable transfer means for transferring data in a regular pattern between said high speed memory and said processing element comprising a plurality of window offset registers each of which can contain an address of an addressable unit of data in said high speed memory;

window offset limit means for limiting the number of window offset registers used;

address register means for containing an address of an addressable unit of data in said high speed memory means, sequential register access means for sequentially accessing said plurality of window offset registers, up to the number contained in said window offset limit means, to transfer the contents of said accessed register to said address register means, and buffer means responsive to said address register means for transferring an addressable unit of data between said high speed memory and said processing element;

means for transferring programming information from said processing element to said programmable transfer means;

a plurality of read/write bits, one bit corresponding to each of said window offset registers;

first synchronization means responsive to said read/write bits to interrupt said buffer means to prevent said buffer means from transferring addressable units of information from said high speed memory to said processor when said read/write bit corresponding to said next window offset register indicates a write operation, said interruption remaining until said processor requests a write operation; and second synchronization means responsive to said read/write bits to interrupt said buffer means to prevent said buffer means from transferring addressable units of information to said high speed memory from said processor when said read/write bit corresponding to said next window offset register indicates a read operation, said interruption remaining until said processor requests a read operation.

8. A high speed random access memory for buffering data transfers between main memory and a processing element of a computer, comprising:

buffer memory means for temporarily storing data;

main memory transfer means for transferring data between said buffer memory means and said main memory;

programmable transfer means for transferring data in a regular pattern between said buffer memory means and said processing element comprising a plurality of window offset registers each of which can contain an address of an addressable unit in said buffer memory, address register means for containing an address of an addressable unit of said buffer memory means, sequential register access means for sequentially accessing said plurality of window offset registers to transfer the contents of said accessed register to said address register means, buffered transfer means responsive to said address register means for transferring an addressable unit of data between said buffer memory and said processing element, a plurality of read/write bits, one bit corresponding to each of said window offset registers, first synchronization means responsive to said read/write bits to interrupt said buffered transfer means to prevent said buffered transfer means from transferring addressable units of information from said high speed memory to said processor when said read/write bit corresponding to said next window offset register indicates a write operation, said interruption remaining until said processor requests a write operation, and second synchronization means responsive to said read/write bits to interrupt said buffered transfer means to prevent said buffered transfer means from transferring addressable units of information to said high speed memory from said processor when said read/write bit corresponding to said next window offset register indicates a read operation, said interruption remaining until said processor requests a read operation; and means for transferring programming information from said processing element to said programmable transfer means.

9. A high speed random access memory as defined in claim 8 further comprising:

window means to reserve an area of said buffer memory for preventing said main memory transfer means and said programmable transfer means from using identical buffer memory addressable units comprising lower bound register means for defining a lowest address of said window, upper bound register means for defining a highest address of said window, and size register means for defining a number of addressable units contained within said window;

access count means for counting accesses made by said processing element to said buffer memory; and window movement means responsive to said access count means for adjusting said lower bound register and said upper bound register when said access count means reaches a predetermined value.

10. The high speed random access memory of claim 8 wherein said buffered transfer means comprises:

a read first-in/first-out buffer comprising a plurality of registers for transferring addressable units of data from said buffer memory to said processing element; and a write first-in/first-out buffer comprising a plurality of registers for transferring addressable units of data from said processing element to said buffer memory;

whereby multiple addressable units of data can be readied for transfer to or from said processing element.

11. The high speed random access memory of claim 8 wherein said sequential register access means further comprises:

base register means for providing a base address of data within said buffer memory;

means for adding said contents of said window offset registers to said base register means and transferring said sum to said address register means;

whereby said addresses in said window offset registers can be short addresses allowing shorter instructions in said processing element.

12. The high speed random access memory as defined in claim 8 wherein said main memory transfer means comprises:

main memory address register means for containing an address of an addressable unit of said main memory;

buffer memory address register means for containing an address of an addressable unit of said buffer memory;

transfer means responsive to both said address register means for moving data between locations addressed by said main memory address register means and said buffer memory address register means;

auto advancing means for autoincrementing or autodecremetning both said address register means after data is transferred between said main memory and said buffer memory; and blocking means for stopping said transfer when said address in said main memory address register mans addresses a portion of said buffer memory being used by said programmable transfer means.

* * * * *